US012790994B1

(12) United States Patent
Rose et al.

(10) Patent No.: US 12,790,994 B1
(45) Date of Patent: Nov. 10, 2026

(54) ASYMMETRICALLY ADJUSTABLE GUIDE VANES FOR AN AIRCRAFT PROPULSION SYSTEM

(71) Applicant: Raytheon Technologies Corporation, Farmington, CT (US)

(72) Inventors: Becky E. Rose, Colchester, CT (US); Carroll V. Sidwell, Wethersfield, CT (US); Michael Winter, New Haven, CT (US)

(73) Assignee: RTX Corporation, Farmington, CT (US)

(*) Notice: Subject to any disclaimer, the term of this patent is extended or adjusted under 35 U.S.C. 154(b) by 41 days.

(21) Appl. No.: 18/106,285

(22) Filed: Feb. 6, 2023

Related U.S. Application Data

(60) Provisional application No. 63/306,734, filed on Feb. 4, 2022.

(51) Int. Cl.

| | |
|---|---|
| ***F01D 17/16*** | (2006.01) |
| ***F02K 1/66*** | (2006.01) |
| ***F02K 1/76*** | (2006.01) |

(52) U.S. Cl.

CPC ................ *F02K 1/66* (2013.01); *F02K 1/763* (2013.01); *F05D 2220/36* (2013.01); *F05D 2240/12* (2013.01); *F05D 2260/57* (2013.01)

(58) Field of Classification Search

CPC .......... F01D 17/16; F01D 17/162; F02K 1/66; F02K 1/763; F05D 2220/36; F05D 2240/12; F05D 2260/57

See application file for complete search history.

(56) References Cited

U.S. PATENT DOCUMENTS

| | | | | |
|---|---|---|---|---|
| 9,242,721 | B2 | 1/2016 | Neuteboom | |
| 10,526,905 | B2 | 1/2020 | Estes | |
| 11,384,649 | B1 * | 7/2022 | Rambo | F01D 9/02 |
| 2011/0176913 | A1 * | 7/2011 | Wassynger | F01D 17/143 415/159 |
| 2021/0215057 | A1 * | 7/2021 | McCaffrey | F04D 29/563 |
| 2022/0275774 | A1 * | 9/2022 | Niergarth | F02K 3/06 |
| 2023/0066572 | A1 * | 3/2023 | Hall | F01D 25/04 |

* cited by examiner

*Primary Examiner* — Nathaniel E Wiehe

*Assistant Examiner* — Maxime M Adjagbe

(74) *Attorney, Agent, or Firm* — Getz Balich LLC

(57) ABSTRACT

An assembly is provided for an aircraft propulsion system. This assembly includes an open propulsor rotor, an open guide vane array and an actuator system. The open propulsor rotor is rotatable about a centerline. The open guide vane array is arranged with the open propulsor rotor. The open guide vane array includes a plurality of guide vanes arranged circumferentially about the centerline. The actuator system is configured to asymmetrically move at least some of the guide vanes.

13 Claims, 9 Drawing Sheets

ASYMMETRICALLY ADJUSTABLE GUIDE VANES FOR AN AIRCRAFT PROPULSION SYSTEM

The application claims priority to U.S. Patent Appln. No. 63/306,734 filed Feb. 4, 2022 which is hereby incorporated herein by reference in its entirety.

BACKGROUND OF THE DISCLOSURE

1. Technical Field

This disclosure relates generally to an aircraft propulsion system and, more particularly, to guide vanes for the aircraft propulsion system.

2. Background Information

An open rotor aircraft propulsion system may include an array of open guide vanes. These open guide vanes may condition air propelled by an open rotor propulsor. Various types and configurations of guide vanes are known in the art. While these known guide vanes have various advantages, there is still room in the art for improvement.

SUMMARY OF THE DISCLOSURE

According to an aspect of the present disclosure, an assembly is provided for an aircraft propulsion system. This assembly includes an open propulsor rotor, an open guide vane array and an actuator system. The open propulsor rotor is rotatable about a centerline. The open guide vane array is arranged with the open propulsor rotor. The open guide vane array includes a plurality of guide vanes arranged circumferentially about the centerline. The actuator system is configured to asymmetrically move at least some of the guide vanes.

According to another aspect of the present disclosure, an apparatus is provided that includes an open rotor aircraft propulsion system. This open rotor aircraft propulsion system includes a guide vane array and an actuator system. The guide vane array is at an exterior of the open rotor aircraft propulsion system. The guide vane array includes a first guide vane and a second guide vane. The first guide vane is pivotable about a first pivot axis. The second guide vane is pivotable about a second pivot axis. The actuator system is configured to asymmetrically pivot the first guide vane and the second guide vane.

According to still another aspect of the present disclosure, a method is provided during which an open rotor aircraft propulsion system is provided with a guide vane array at an exterior of the open rotor aircraft propulsion system. The guide vane array includes a first guide vane and a second guide vane. The first guide vane is pivotable about a first axis. The second guide vane is pivotable about a second axis. The first guide vane and the second guide vane are asymmetrically pivoted.

The asymmetrically pivoting may include: pivoting the first guide vane a first number of degrees about the first pivot axis; and pivoting the second guide vane a second number of degrees about the second pivot axis that is different than the first number of degrees.

The asymmetrically pivoting may include: pivoting the first guide vane a first direction about the first pivot axis; and pivoting the second guide vane a second direction about the second pivot axis that is opposite the first direction.

The first guide vane and the second guide vane may be asymmetrically pivoted to account for one or more inlet conditions to the open rotor aircraft propulsion system.

The first guide vane and the second guide vane may be asymmetrically pivoted to direct flow around a downstream obstacle.

The first guide vane and the second guide vane may be asymmetrically pivoted during a reverse thrust mode of operation of the open rotor aircraft propulsion system.

The first guide vane and the second guide vane may be asymmetrically pivoted for trimming an aircraft configured with the open rotor aircraft propulsion system.

The at least some of the guide vanes may include a first guide vane and a second guide vane. The actuator system may be configured to concurrently: pivot the first guide vane a first number of degrees about a pivot axis of the first guide vane; and pivot the second guide vane a second number of degrees about a pivot axis of the second guide vane. The second number of degrees may be different than the first number of degrees.

The at least some of the guide vanes may include a first guide vane and a second guide vane. The actuator system may be configured to concurrently: pivot the first guide vane a first direction about a pivot axis of the first guide vane; and pivot the second guide vane a second direction about a pivot axis of the second guide vane. The second direction may be opposite the first direction.

The at least some of the guide vanes may include a first guide vane and a second guide vane. The actuator system may be configured to concurrently: pivot the first guide vane a first direction about a pivot axis of the first guide vane; and pivot the second guide vane the first direction about a pivot axis of the second guide vane.

The at least some of the guide vanes may include a first guide vane and a second guide vane. The actuator system may be configured to adjust a position of the first guide vane and maintain a position of the second guide vane in a first mode. The actuator system may be configured to adjust the position of the second guide vane in a second mode.

The actuator system may also be configured to adjust the position of the first guide vane in the second mode.

The actuator system may also be configured to maintain the position of the first guide vane in the second mode.

The actuator system may also be configured to symmetrically move the at least some of the guide vanes.

A vane support structure may be included. Each of the guide vanes may project out from and/or may be cantilevered from the vane support structure.

Each of the guide vanes may be configured with and project spanwise to an un-ducted tip.

The open propulsor rotor may be upstream of the open guide vane array along a flowpath.

The aircraft propulsion system may be configured as an open rotor aircraft propulsion system. The open guide vane array may be arrangeable at an exterior of the open rotor aircraft propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
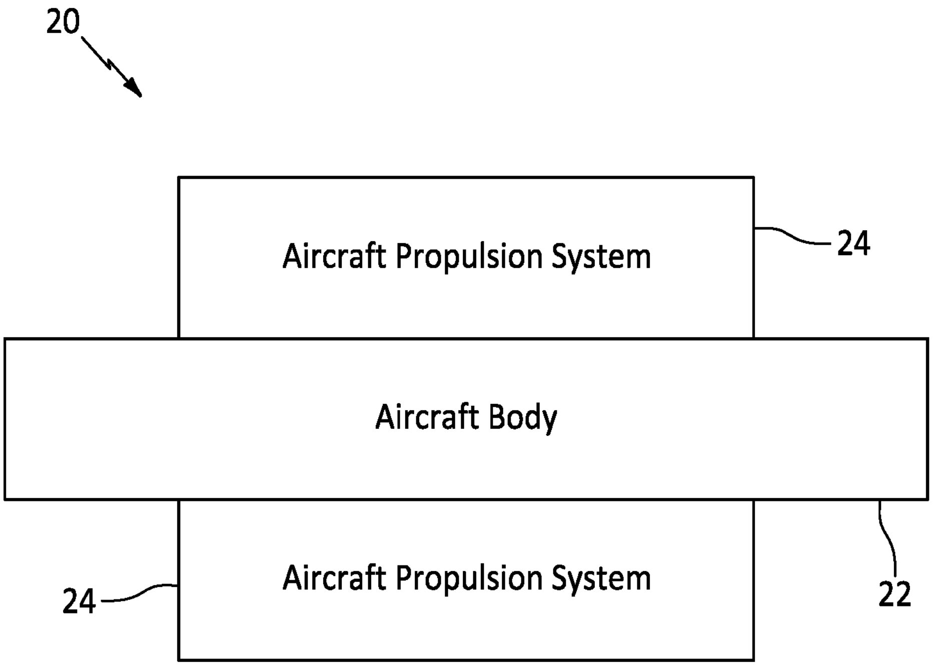
FIG. 1 is a schematic illustration of an aircraft.

FIG. 1 is a schematic illustration of an aircraft 20 such as, but not limited to, an airplane. This aircraft 20 includes an aircraft body 22 and one or more aircraft propulsion systems 24 configured to provide aircraft thrust. The aircraft body 22 may include a fuselage and one or more wings connected to and projecting out from the fuselage. The aircraft propulsion systems 24 are arranged with the aircraft body 22. Each of the aircraft propulsion systems 24, for example, may be mounted to a respective one of the wings or to the fuselage via a pylon or other mounting structure.

Figure 2:
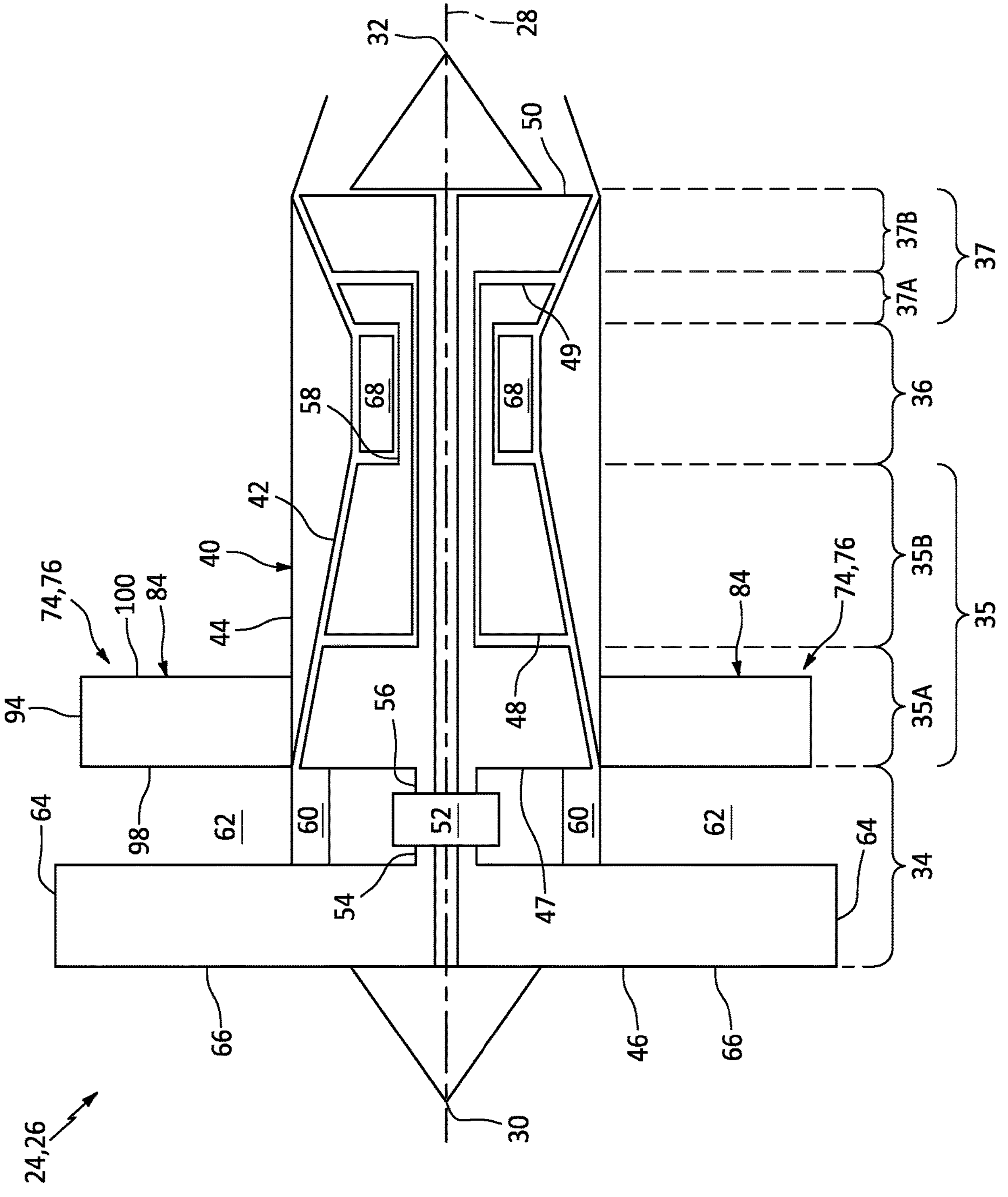
FIG. 2 is a sectional schematic illustration of an aircraft propulsion system.

Referring to FIG. 2, each of the aircraft propulsion systems 24 may be configured as an open rotor aircraft propulsion system 26 with, for example, a tractor configuration. The aircraft propulsion system 26 of FIG. 2, for example, extends axially along an axial centerline 28 between a forward, upstream end 30 and an aft, downstream end 32, which axial centerline 28 may also be a rotational axis of the aircraft propulsion system 26. The aircraft propulsion system 26 includes a propulsor (e.g., an unducted fan) section 34, a compressor section 35, a combustor section 36 and a turbine section 37. The compressor section 35 of FIG. 2 includes a low pressure compressor (LPC) section 35A and a high pressure compressor (HPC) section 35B. The turbine section 37 of FIG. 2 includes a high pressure turbine (HPT) section 37A and a low pressure turbine (LPT) section 37B.

The engine sections 34-37B are arranged sequentially along the axial centerline 28 between the upstream end 30 and the downstream end 32. The propulsor section 34 is configured outside of a housing 40 of the aircraft propulsion system 26 at an exterior of the aircraft propulsion system 26 and its housing 40. The engine sections 35A-37B are arranged within the housing 40. The housing 40 of FIG. 2, for example, includes a case 42 and a nacelle 44. The case 42 houses one or more of the engine sections 35A-37B; e.g., an engine core. The nacelle 44 houses and provides an aerodynamic cover for the case 42.

Each of the engine sections 34, 35A, 35B, 37A and 37B includes a respective bladed rotor 46-50. Each of these bladed rotors 46-50 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The open propulsor rotor 46 of FIG. 2 is connected to a gear train 52, for example, through a propulsor shaft 54. The gear train 52 and the LPC rotor 47 are connected to and driven by the LPT rotor 50 through a low speed shaft 56. The HPC rotor 48 is connected to and driven by the HPT rotor 49 through a high speed shaft 58.

During operation, the open propulsor rotor 46 directs (e.g., propels) an inner stream of air into a core flowpath 60 (e.g., an internal flowpath) within the aircraft propulsion system 26 and its engine core. This core flowpath 60 extends sequentially through the engine sections 35A-37B. The air within the core flowpath 60 may be referred to as core air. The open propulsor rotor 46 also directs (e.g., propels) an outer stream of air into a bypass flowpath 62. This bypass flowpath 62 is in fluid communication with the propulsor section 34 and bypasses the engine core. The bypass flowpath 62 of FIG. 2, more particularly, is an open flowpath at the exterior of the aircraft propulsion system 26. The housing 40 and its nacelle 44, for example, may at least partially or completely form an inner peripheral boundary of the bypass flowpath 62 downstream of the open propulsor rotor 46 and along the engine core. An outer peripheral boundary of the bypass flowpath 62 may be defined by a (e.g., imaginary) reference line that extends substantially axially along the axial centerline 28 aft from an outer periphery of the open propulsor rotor 46; e.g., aft from tips 64 of open rotor propulsor blades 66. The air within the bypass flowpath 62 may be referred to as bypass air.

The core air is compressed by the LPC rotor 47 and the HPC rotor 48 and directed into a combustion chamber 68 of a combustor in the combustor section 36. Fuel is injected into the combustion chamber 68 and mixed with the compressed core air to provide a fuel-air mixture. This fuel-air mixture is ignited and combustion products thereof flow through and sequentially cause the HPT rotor 49 and the LPT rotor 50 to rotate. The rotation of the HPT rotor 49 and the LPT rotor 50 respectively drive rotation of the HPC rotor 48 and the LPC rotor 47 and, thus, compression of the air received from a core airflow inlet. The rotation of the LPT rotor 50 also drives rotation of the open propulsor rotor 46, which propels the bypass air outside of and axially along the housing 40 via the bypass flowpath 62. The bypass air may account for a majority of thrust generated by the aircraft propulsion system 26, e.g., more than seventy-five percent (75%) of thrust. The aircraft propulsion system 26 of the present disclosure, however, is not limited to the foregoing exemplary thrust ratio.

Figure 3:
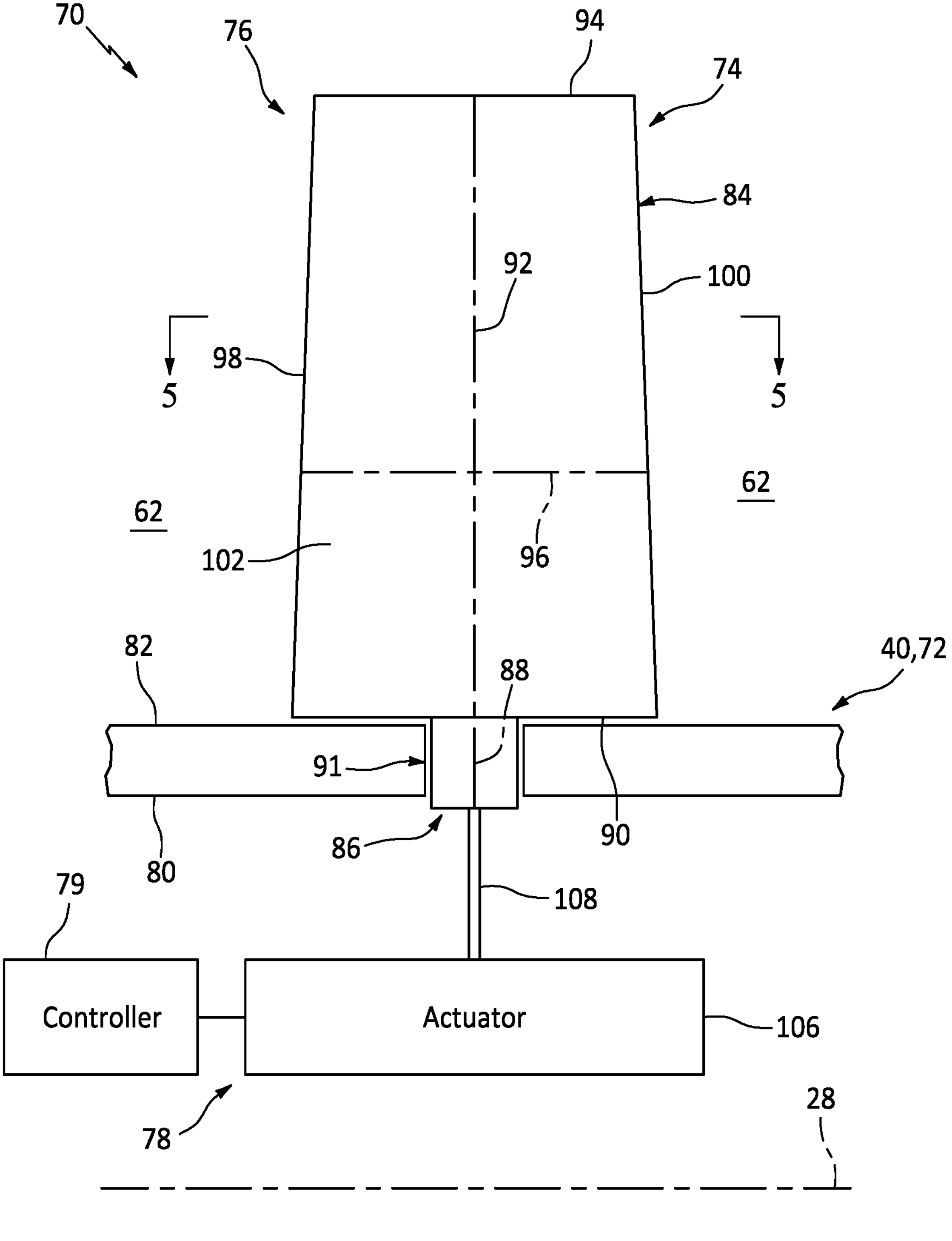
FIG. 3 is a partial schematic illustration of an assembly for the aircraft propulsion system.

FIG. 3 illustrates an assembly 70 of the aircraft propulsion system 26. This propulsion system assembly 70 includes a vane support structure 72, one or more (e.g., variable) open guide vanes 74 (see also FIG. 4) forming an open guide vane array 76, an actuator system 78, and a controller 79 (e.g., a processing system).

The vane support structure 72 is configured to support the one or more open guide vanes 74. The vane support structure 72 is also configured to form a portion of the inner peripheral boundary of the bypass flowpath 62. The vane support structure 72, for example, is configured as a part of the housing 40 of FIG. 2.

Figure 4:
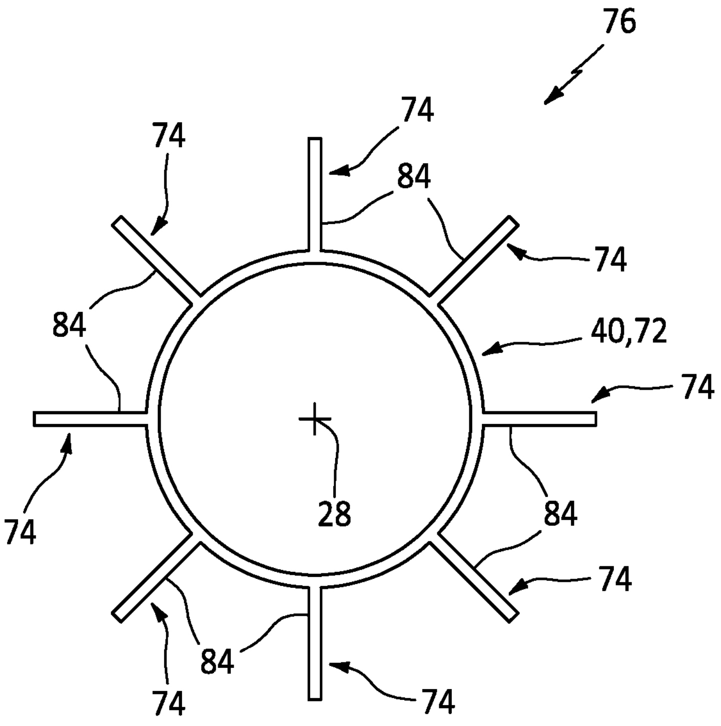
FIG. 4 is an end view schematic illustration of a guide vane array.

The vane support structure 72 of FIG. 3 extends axially along the axial centerline 28. The vane support structure 72 extends radially between and to a radial inner side 80 of the vane support structure 72 and a radial outer side 82 of the vane support structure 72, which structure outer side 82 at least partially forms the peripheral boundary of the bypass flowpath 62. Referring to FIG. 4, the vane support structure 72 extends circumferentially about (e.g., completely around) the axial centerline 28, which may thereby provide the vane support structure 72 with a full-hoop, tubular body.

The open guide vanes 74 are distributed circumferentially about the axial centerline 28 in the open guide vane array 76. Referring to FIG. 2, the open guide vane array 76 and its open guide vanes 74 are arranged with the open propulsor rotor 46. The open guide vane array 76, for example, circumscribes the housing 40. The open guide vane array 76 of FIG. 2 and its open guide vanes 74 are disposed downstream of the open propulsor rotor 46 and its open rotor propulsor blades 66 (e.g., un-ducted, unshrouded fan blades) along the bypass flowpath 62.

Referring to FIG. 3, each of the guide vanes 74 projects radially out from and may be cantilevered from the housing 40 and its vane support structure 72. Each of the guide vanes 74 of FIG. 3, for example, includes a vane airfoil 84 and a vane mount 86 (e.g., a shaft) configured to pivotally mount the vane airfoil 84 to the vane support structure 72. The vane mount 86 of FIG. 3 projects along a pivot axis 88 of the respective guide vane 74 (e.g., radially relative to the axial centerline 28) out from a base 90 of the vane airfoil 84 and into a respective mount aperture 91 in the vane support structure 72. The pivot axis 88 of FIG. 3 is angularly offset from (e.g., perpendicular to) the axial centerline 28.

Figure 5:
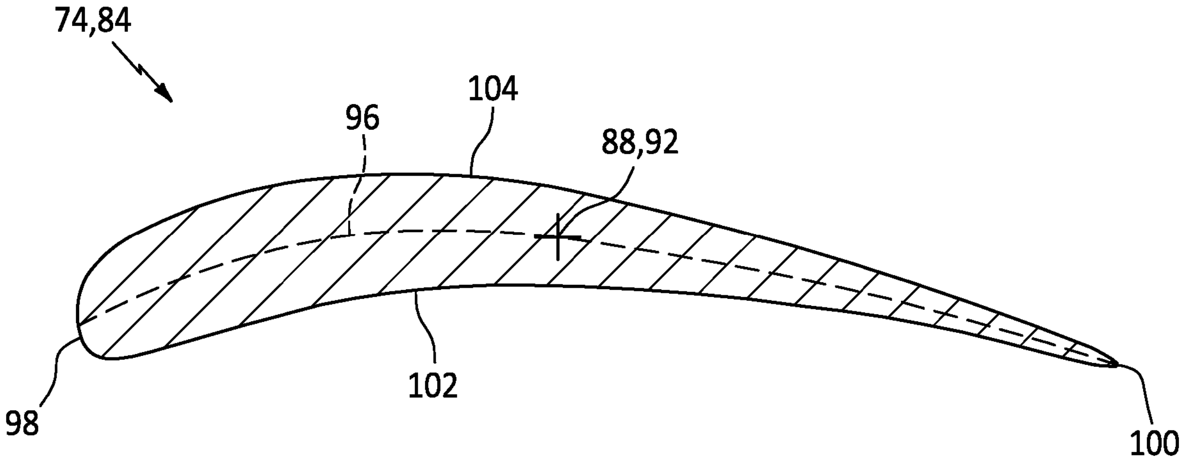
FIG. 5 is a schematic sectional illustration of a guide vane airfoil taken along line 5-5 in FIG. 3.

The vane airfoil 84 of FIG. 3 extends spanwise along the pivot axis 88 and a span 92 of the vane airfoil 84 from the airfoil base 90 to a distal (e.g., unsupported, unshrouded, unducted, etc.) tip 94 of the vane airfoil 84. The vane airfoil 84 extends longitudinally along a camber line 96 of the vane airfoil 84 between and to a leading edge 98 of the vane airfoil 84 and a trailing edge 100 of the vane airfoil 84. Referring to FIG. 5, the vane airfoil 84 extends laterally (e.g., widthwise, circumferentially about the axial centerline 28) between and to a (e.g., concave) pressure side 102 of the vane airfoil 84 and a (e.g., convex) suction side 104 of the vane airfoil 84. Each of these airfoil sides 102 and 104 extends spanwise from the airfoil base 90 to the airfoil tip 94 (see FIG. 3). Each of the airfoil sides 102 and 104 extends longitudinally between and may meet at the airfoil leading edge 98 and the airfoil trailing edge 100.

Referring to FIG. 3, the actuator system 78 is configured to selectively move one or more or all of the open guide vanes 74. The actuator system 78, more particularly, is configured to pivot each respective open guide vane 74 and its vane airfoil 84 about the respective pivot axis 88. The actuator system 78 of FIG. 3, for example, includes one or more actuators 106 (one visible in FIG. 3) and one or more linkages 108 (one visible in FIG. 3), where each linkage 108 motively couples a respective one of the actuators 106 to one or more of the open guide vanes 74 and their vane mounts 86. For example, each actuator 106 and each linkage 108 may be associated with and configured to move a respective single one of the open guide vanes 74. Alternatively, one or more of the actuators 106 may each be configured to (e.g., synchronously) move a set of two or more of the open guide vanes 74 via one or more of the linkages 108. With such an arrangement, the actuator system 78 is configured symmetrically or asymmetrically move (e.g., pivot) at least some or all of the open guide vanes 74.

Figure 6:
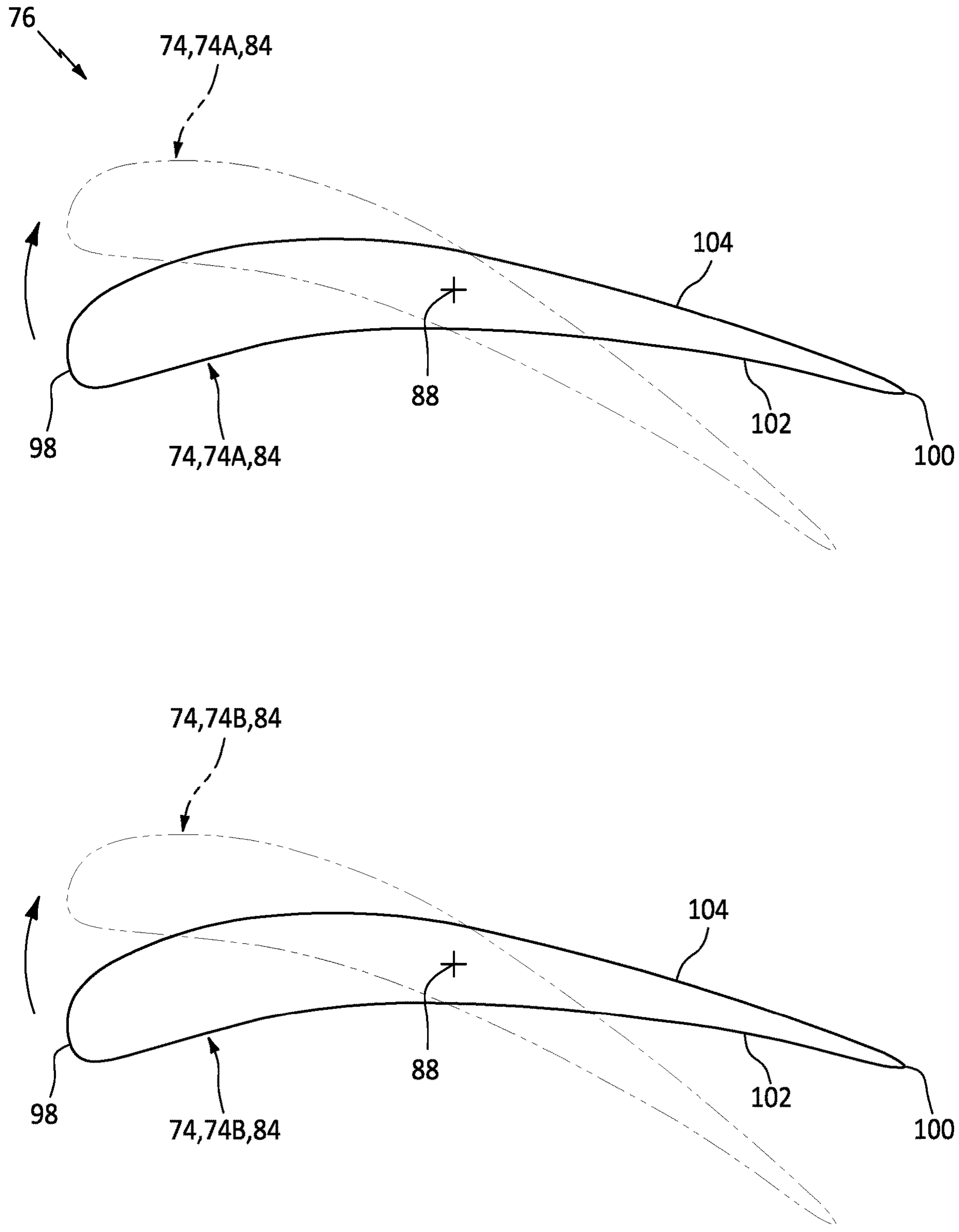
FIG. 6 is a partial sectional illustration of the guide vane array depicting symmetric guide vane movement.

During symmetric movement, referring to FIG. 6, the respective open guide vanes 74 concurrently pivot about their pivot axes 88 in a common (e.g., the same) manner between first and second positions. The open guide vanes 74 of FIG. 6, for example, pivot about their pivot axes 88 in a common rotational direction; e.g., clockwise or counterclockwise. The open guide vanes 74 pivot about their pivot axes 88 at a common rotational speed. The open guide vanes 74 of FIG. 6 may thereby pivot a common number of degrees (e.g., rotational distance) about their pivot axes 88 from their first positions (see solid lines) to their second positions (see dashed lines).

Figure 7:
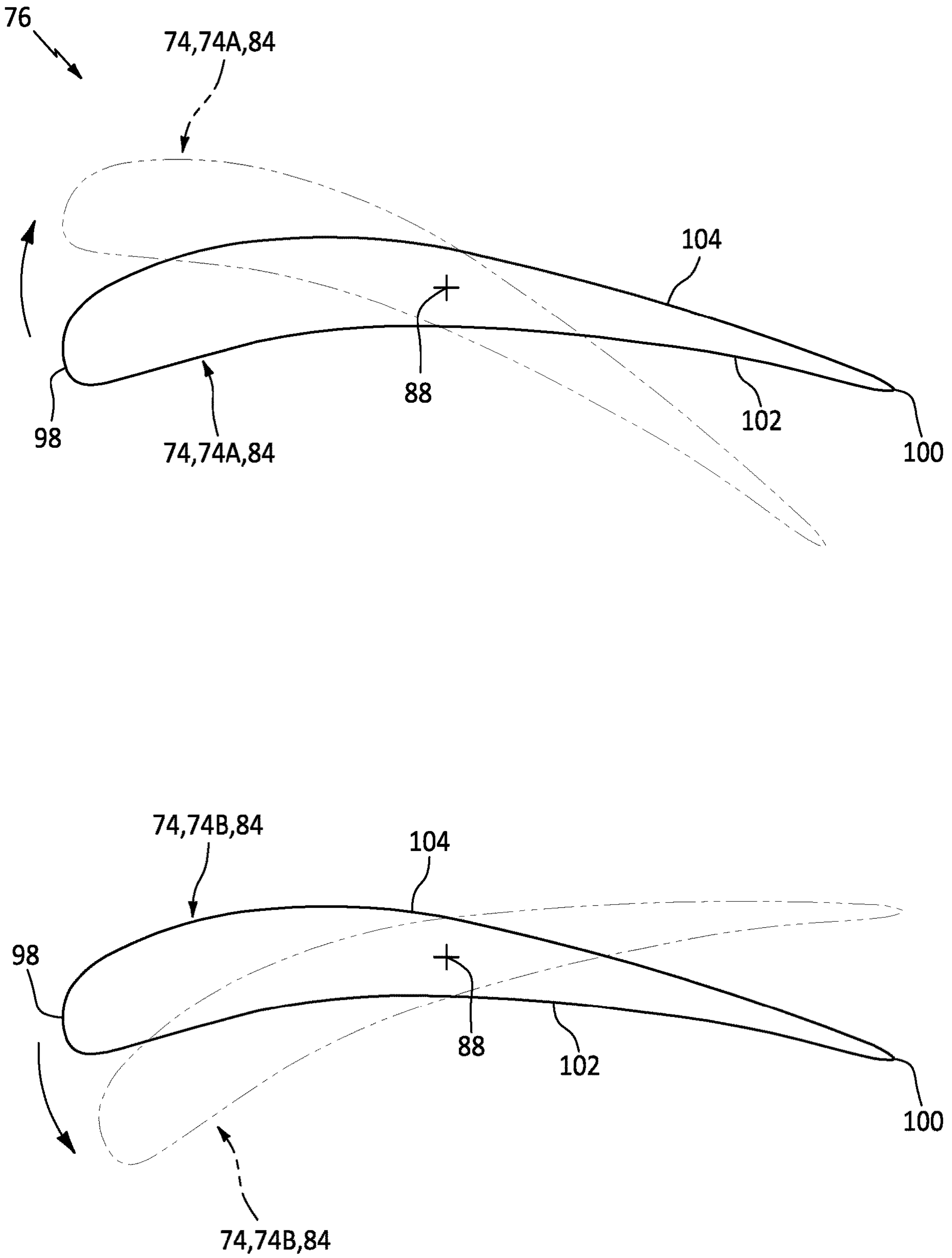
FIGS. 7-9 are partial sectional illustrations of the guide vane array depicting various asymmetric guide vane movements.
Figure 8:
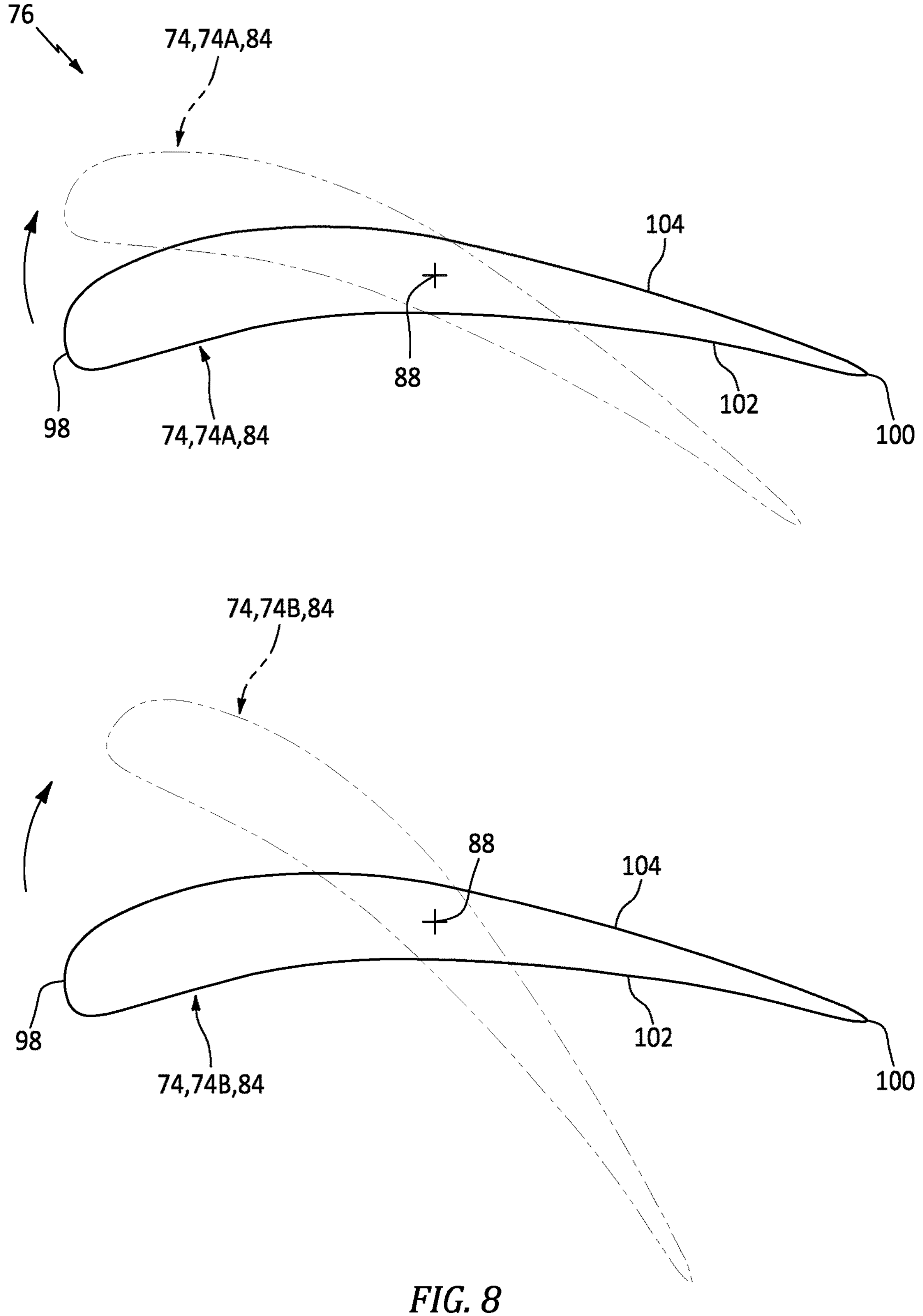
Figure 9:
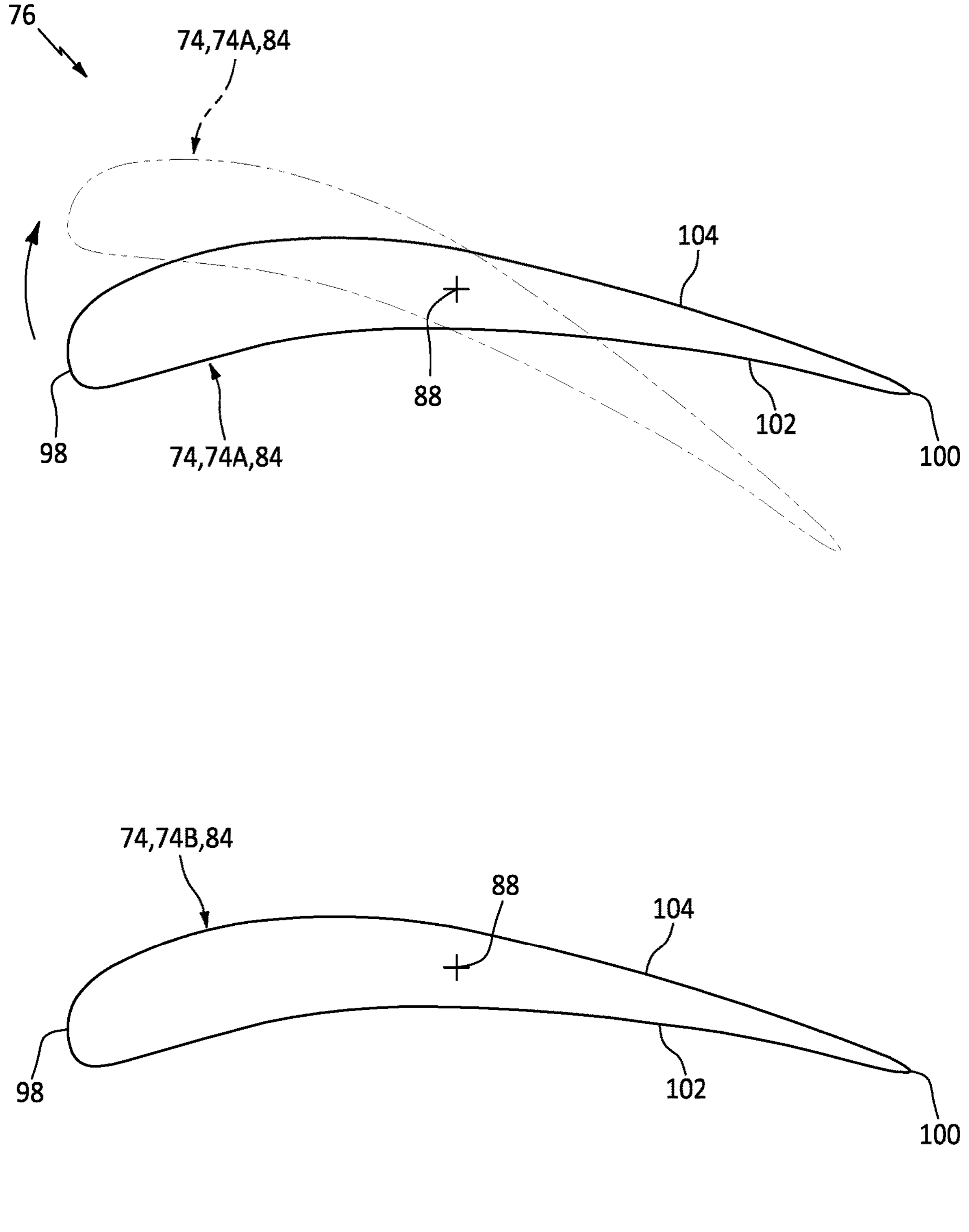

During asymmetric movement, referring to FIGS. 7-9, the respective open guide vanes 74 concurrently pivot about their pivot axes 88 in unique (e.g., discrete, different) manners between their first and second positions. For example, referring to FIG. 7, the open guide vanes 74A and 74B (generally referred to as 74) may pivot about their pivot axes 88 in unique rotational directions. The first open guide vane 74A of FIG. 7, in particular, pivots about its pivot axis 88 in a first rotational direction; e.g., clockwise or counterclockwise. The second open guide vane 74B of FIG. 7 pivots about its pivot axis 88 in a second rotational direction (e.g., counterclockwise or clockwise) that is opposite the first rotational direction. The open guide vanes 74 may also or alternatively pivot about their pivot axes 88 at unique rotational speeds. Referring to FIG. 8, the open guide vanes 74 may also or alternatively each pivot a unique number of degrees about their pivot axis 88 from their first positions (see solid lines) to their second positions (see dashed lines). The first open guide vane 74A of FIG. 8, in particular, pivots about its pivot axis 88 a first number of degrees. The second open guide vane 74B of FIG. 8 pivots about its pivot axis 88 a second number of degrees that is different (e.g., greater or less) than the first number of degrees. Referring to FIG. 9, one or more of the open guide vanes 74 may pivot about their pivot axes 88 while one or more others of the open guide vanes 74 may remain stationary. The first open guide vane 74A of FIG. 9, for example, may pivot about its pivot axis 88 and the second open guide vane 74B may remain stationary (e.g., not pivot about its pivot axis 88) during a mode of operation. Of course, in other modes of operation, the second open guide vane 74B may pivot and the first open guide vane 74A may remain stationary. In still other modes of operation, both the first and the second open guide vanes 74A and 74B may pivot about their pivot axes 88.

Various examples of asymmetric movement are described above. The present disclosure, however, is not limited to these exemplary asymmetric movements. For example, in other embodiments, any two or more of the foregoing asymmetric movement may be combined together to further tailor open guide vane movement. Furthermore, the concurrent asymmetric movement of the guide vanes 74 may occur simultaneously or temporally overlapping. For example, simultaneous asymmetric movement of some or all of the open guide vanes 74 may begin and/or end at a common point in time. Alternatively, temporally overlapping asymmetric movement of some or all of the open guide vanes 74 may begin and/or end at unique points in time where movement of those open guide vanes 74 temporally overlap; e.g., movement of a first of the open guide vanes 74 occurs during at least a portion of movement of a second of the open guide vanes 74.

Figure 10:
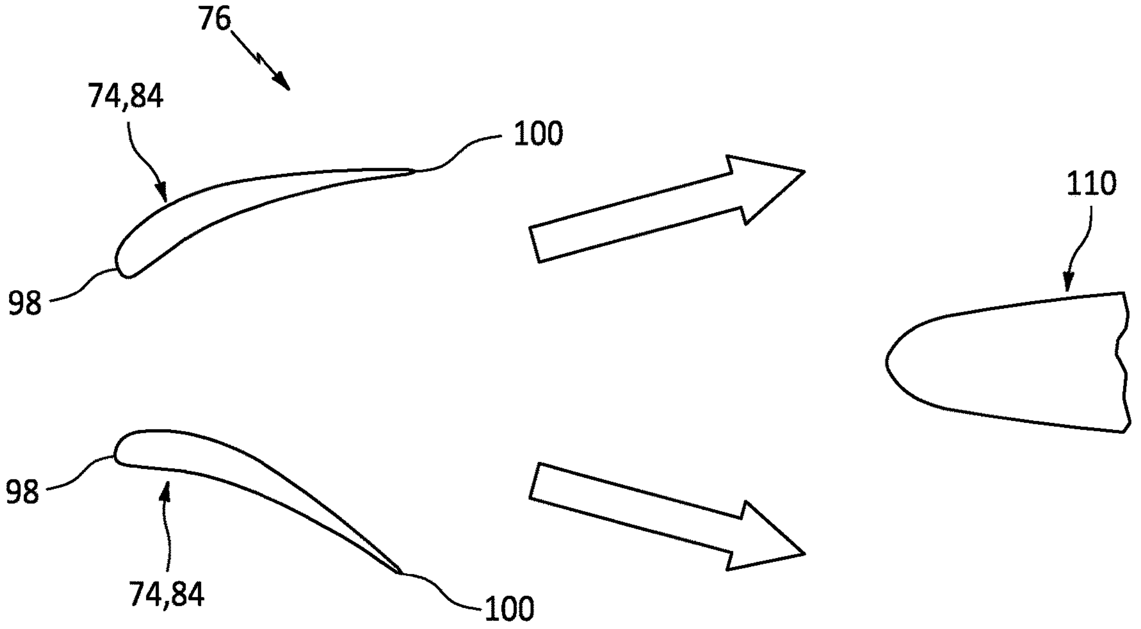
FIG. 10 is a partial sectional illustration of the guide vane array directing an airflow around a downstream obstacle.
Figure 11:
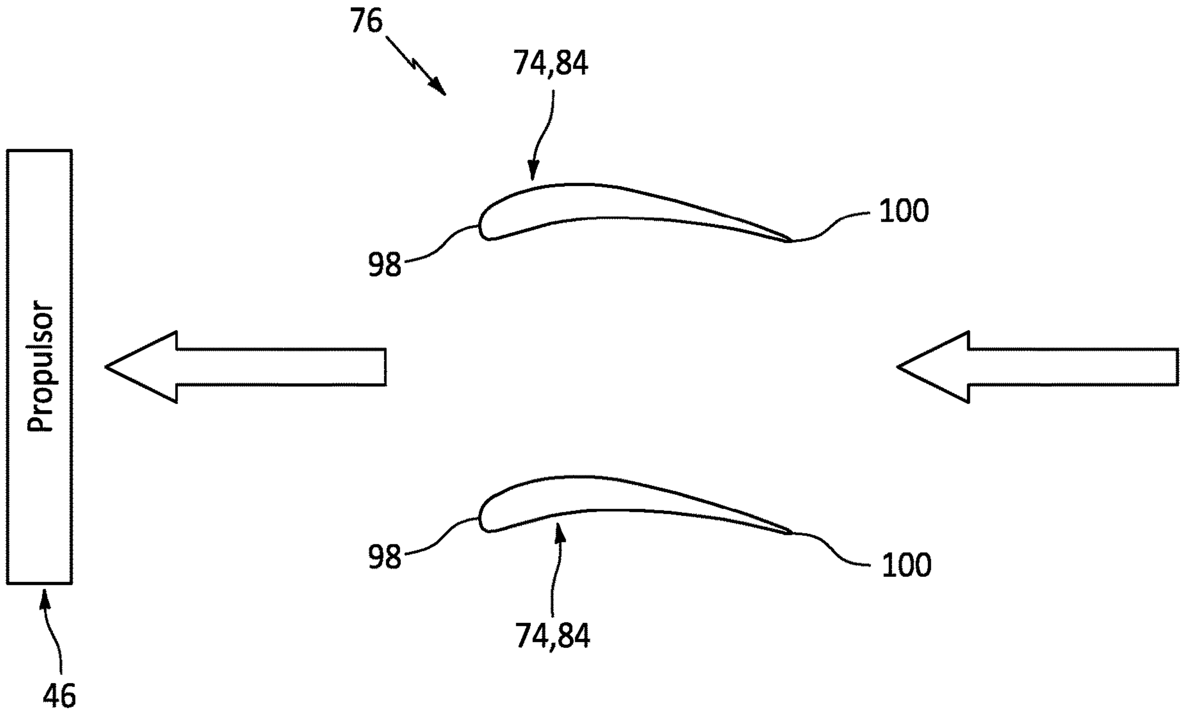
FIG. 11 is a partial sectional illustration of the guide vane array arranged with an open propulsor rotor during a reverse thrust mode of operation.

The actuator system 78 of FIG. 3 asymmetrically moves (e.g., pivots) at least some or all of the open guide vanes 74 to tune (e.g., adjust, optimize, minimize, maximize, etc.) one or more aircraft propulsion system parameters and/or one or more aircraft parameters. The open guide vanes 74, for example, may be asymmetrically moved to account for one or more inlet conditions to the aircraft propulsion system 24, 26 of FIG. 2. The open guide vanes 74, for example, may be moved based on an angle of attack of incoming air to the aircraft propulsion system 24, 26 and/or distortions in the incoming air. Referring to FIG. 10, the open guide vanes 74 may also or alternatively be asymmetrically moved to direct air (e.g., the bypass air) around a downstream obstacle 110 such as, but not limited to, the pylon for mounting the aircraft propulsion system 24, 26 to the aircraft body 22 (see FIG. 1). The open guide vanes 74 may also or alternatively be asymmetrically moved to facilitate trimming of the aircraft 20 (see FIG. 1). Asymmetric movement of the open guide vanes 74, for example, may affect aircraft pitch, aircraft roll and/or aircraft yaw. Referring to FIG. 11, the open guide vanes 74 may also or alternatively be asymmetrically moved to direct air during a reverse thrust mode of operation. During this reverser thrust mode of operation, a pitch of the open rotor propulsor blades 66 may be changed; e.g., reversed.

The controller 79 of FIG. 3 is in signal communication with the actuator system 78. The processing system 79, for example, may be hardwired and/or wirelessly coupled with one or more or each of the one or more actuators 106.

The controller 79 may be implemented with a combination of hardware and software. The hardware may include a memory and at least one processing device, which processing device may include one or more single-core and/or multi-core processors. The hardware may also or alternatively include analog and/or digital circuitry other than that described above.

The memory is configured to store software (e.g., program instructions) for execution by the processing device, which software execution may control and/or facilitate performance of one or more operations described above. The memory may be a non-transitory computer readable medium. For example, the memory may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The aircraft propulsion system 24, 26 of FIG. 2 is described with a tractor configuration. The guide vane array 76 and its open guide vanes 74, for example, are arranged downstream of the open propulsor rotor 46 and is propulsor blades 66. The guide vane array 76 and its open guide vanes 74, however, may alternatively be arranged upstream of an open propulsor rotor and is rotor blades. With such an arrangement, the aircraft propulsion system 24 may be an open rotor aircraft propulsion system with a pusher configuration; e.g., a pusher fan aircraft propulsion system. The present disclosure, of course, is not limited to the exemplary aircraft propulsion systems described above. The propulsion system assembly 70 of FIG. 3, for example, may be configured with various other types and configurations of aircraft propulsion systems.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:

a housing;

a propulsor section including an open propulsor rotor, an open guide vane array, and an actuator system, the propulsor section disposed outside of the housing, the open propulsor rotor rotatable about a centerline, the open guide vane array arranged with the open propulsor rotor, the open guide vane array comprising a plurality of guide vanes arranged circumferentially about the centerline, and the actuator system configured to asymmetrically move at least some of the plurality of guide vanes;

a vane support structure, each of the plurality of guide vanes projecting out from and cantilevered from the vane support structure, and each of the guide vanes projecting spanwise from the vane support structure to an un-ducted tip;

a compressor section disposed along an axial centerline;

a combustor section disposed downstream of the compressor section along the axial centerline; and a turbine section disposed downstream of the compressor section and the combustor section along the axial centerline;

wherein the at least some of the plurality of guide vanes include a first guide vane and a second guide vane and the actuator system is configured to concurrently pivot the first guide vane a first direction about a pivot axis of the first guide vane; and pivot the second guide vane a second direction about a pivot axis of the second guide vane, and the second direction is opposite the first direction.

2. The assembly of claim 1, wherein the actuator system is further configured to concurrently pivot the first guide vane a first number of degrees about the pivot axis of the first guide vane; and pivot the second guide vane a second number of degrees about the pivot axis of the second guide vane, and the second number of degrees is different than the first number of degrees.

3. The assembly of claim 1, wherein the at least some of the plurality of guide vanes include a first guide vane and a second guide vane; and the actuator system is configured to concurrently pivot the first guide vane a first direction about a pivot axis of the first guide vane; and pivot the second guide vane the first direction about a pivot axis of the second guide vane.

4. The assembly of claim 1, wherein the open propulsor rotor is upstream of the open guide vane array along a flowpath.

5. The assembly of claim 1, wherein the aircraft propulsion system is configured as an open rotor aircraft propulsion system, and the open guide vane array is arrangeable at an exterior of the open rotor aircraft propulsion system.

6. The assembly of claim 1, wherein the at least some of the plurality of guide vanes include a first guide vane and a second guide vane;

the first guide vane includes a first vane mount;

the first vane mount extends from a base of the first guide vane;

the actuator system includes a first actuator and a first linkage; and the first linkage couples the first actuator to the first guide vane at the first vane mount.

7. The assembly of claim 6, wherein the second guide vane includes a second vane mount;

the second vane mount extends from a base of the second guide vane;

the actuator system includes a second actuator and a second linkage; and the second linkage couples the second actuator to the second guide vane at the second vane mount.

8. An apparatus, comprising:

an open rotor aircraft propulsion system comprising a propulsor section, a compressor section, a combustor section, and a turbine section disposed sequentially along a central axis;

the propulsor section including a guide vane array, a vane support structure and an actuator system;

the guide vane array at an exterior of the open rotor aircraft propulsion system, the guide vane array disposed radially outboard of the compressor section, the guide vane array comprising a first guide vane and a second guide vane, the first guide vane pivotable about a first pivot axis, the first guide vane projecting spanwise from the vane support structure to a first un-ducted tip, the second guide vane pivotable about a second pivot axis, and the second guide vane projecting spanwise from the vane support structure to a second un-ducted tip; and the actuator system configured to asymmetrically pivot the first guide vane and the second guide vane, the actuator system including a first linkage and a second linkage, the first linkage coupled to the first guide vane at a first guide vane mount, the second linkage coupled to the second guide vane at a second guide vane mount, the first guide vane mount extending from a base of the first guide vane, and the second guide vane mount extending from a base of the second guide vane;

wherein the actuator system is further configured to concurrently:

pivot the first guide vane a first direction about a pivot axis of the first guide vane; and pivot the second guide vane a second direction about a pivot axis of the second guide vane, and the second direction is opposite the first direction.

9. A method, comprising:

providing an open rotor aircraft propulsion system with an open guide vane array at an exterior of the open rotor aircraft propulsion system, the open guide vane array including a first guide vane and a second guide vane, the first guide vane pivotable about a first axis, and the second guide vane pivotable about a second axis; and asymmetrically pivoting the first guide vane and the second guide vane, wherein the first guide vane and the second guide vane are asymmetrically pivoted to direct flow around a downstream pylon;

wherein each of the first guide vane and the second guide vane extend spanwise from a vane support structure to an un-ducted tip;

wherein the asymmetrically pivoting includes pivoting the first guide vane a first direction about the first axis; and pivoting the second guide vane a second direction about the second axis that is opposite the first direction.

10. The method of claim 9, wherein the asymmetrically pivoting further includes pivoting the first guide vane a first number of degrees about the first axis; and pivoting the second guide vane a second number of degrees about the second axis that is different than the first number of degrees.

11. The method of claim 9, wherein the first guide vane and the second guide vane are asymmetrically pivoted to account for one or more inlet conditions to the open rotor aircraft propulsion system.

12. The method of claim 9, wherein the first guide vane and the second guide vane are asymmetrically pivoted during a reverse thrust mode of operation of the open rotor aircraft propulsion system.

13. The method of claim 9, wherein the first guide vane and the second guide vane are asymmetrically pivoted for trimming an aircraft configured with the open rotor aircraft propulsion system.

* * * * *